United States Patent [19]

Kinoshita et al.

[11] Patent Number: 4,961,486
[45] Date of Patent: Oct. 9, 1990

[54] RETAINER PLATE OF A ONE-WAY CLUTCH ASSEMBLY

[75] Inventors: Yoshio Kinoshita, Ayase; Shigeaki Koshino, Ohiso; Yoshiaki Sakai, Fujisawa, all of Japan

[73] Assignee: NSK-Warner Kabushiki Kaisha, Tokyo, Japan

[21] Appl. No.: 247,468

[22] Filed: Sep. 21, 1988

[51] Int. Cl.$^5$ .............................................. F16B 13/58
[52] U.S. Cl. .................................. 192/41 R; 192/45.1; 192/41 A; 192/113 B
[58] Field of Search ................ 192/41 A, 45.1, 113 B, 192/115; 384/474, 475; 188/71.2, 82.8, 82.84, 264 B

[56] References Cited

U.S. PATENT DOCUMENTS

| | | | |
|---|---|---|---|
| 3,075,623 | 1/1963 | Lund | 192/45.1 |
| 3,175,661 | 3/1965 | Maurer et al. | 192/45.1 |
| 4,714,803 | 12/1987 | Lederman | 192/113 B |
| 4,736,827 | 4/1988 | Kinoshita | 192/41 A |
| 4,757,887 | 7/1988 | Ostrander et al. | 192/41 A |
| 4,792,028 | 12/1988 | Nishimura et al. | 192/41 A |

FOREIGN PATENT DOCUMENTS 061326 4/1982 Japan .................................. 192/41 A

*Primary Examiner*—Rodney H. Bonck
*Assistant Examiner*—Nicholas Whitelaw
*Attorney, Agent, or Firm*—Skjerven, Morrill, MacPherson, Frankling & Friel

[57] ABSTRACT

A retainer plate of a one-way clutch assembly for retaining the one-way clutch assembly in position between a pair of outer and inner rings. The retainer plate is generally ring-shaped and recessed at a plurality of locations at least at one surface, so that when the retainer plate is brought into contact with the outer ring for having the retainer plate fixedly attached to the outer ring, there are formed a plurality of radially extending flow passages between the retainer plate and the outer ring. Therefore, a part of the lubricant supplied through a supply port of the inner ring may pass through these flow channels to be supplied to thrust bearings and/or to a clutch plate assembly which is provided at the outer periphery of the outer ring.

10 Claims, 4 Drawing Sheets

FIG.3
FIG.4
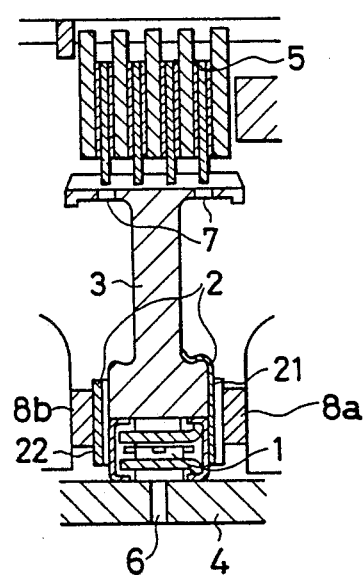
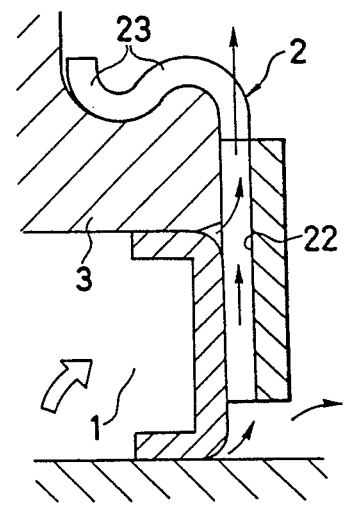

RETAINER PLATE OF A ONE-WAY CLUTCH ASSEMBLY

BACKGROUND OF THE INVENTION

1. Field of the Invention

This invention generally relates to a one-way clutch assembly to be interposed between a pair of outer and inner rings to control the transmission of a rotating torque therebetween only in a predetermined one rotating direction, and, in particular, to a retainer plate which is to be fixedly attached to either one or both of the inner and outer rings for retaining such a one-way clutch assembly in position between the inner and outer rings axially.

2. Description of the Prior Art

A one-way, clutch assembly for use in a driving apparatus, such as a prime mover, for controlling the transmission of a rotating force between a pair of rotating objects, such as a pair of outer and inner rings, such that a rotating force is transmitted only in a predetermined rotating direction between the two objects is well known. Such a one-way clutch assembly may, for example, include a so-called sprag-synchronized one-way clutch assembly. FIG. 9 schematically illustrates a typical prior art structure in which a one-way clutch assembly is mounted in position using a prior art retainer plate. As shown, a one-way clutch assembly 1 is disposed between an outer ring 3 and an inner ring 4 and the one-way clutch assembly 1 is set in position by a pair of retainer plates 2 which are fixedly attached to the outer ring 3 on opposite sides. Since the one-way clutch assembly 1 is sandwiched between the pair of retainer plates 2 which are fixedly attached to the opposite sides of the outer ring 3, the one-way clutch assembly 1 is maintained in position axially.

Disposed in contact with the pair of retainer plates 2 in the axial direction is a pair of thrust bearings 8a and 8b, which are mounted between another stationary object and the outer ring 3 with the retainer plates 2 sandwiched between the outer ring 3 and the thrust bearings 8a, 8b. In this manner, the one-way clutch assembly 1 may be securely maintained in position axially. If the magnitude of the load in the thrust direction is not so significant, use is often made of a spacer comprised of a resin material, which also serves as a thrust bearing, in place of a typical thrust bearing. A clutch plate assembly 5 is mounted at the outer peripheral surface of the outer ring 3. A plurality of through holes 7 are provided at the outer peripheral surface of the outer ring 3 so as to allow a lubricant, such as oil, to be supplied to the clutch plate assembly 5. On the other hand, a supply port 6 is formed in the inner ring 4 so as to supply the lubricant from a source of lubricant to the one-way clutch assembly 1.

In the above-described typical prior art structure, if the thrust bearings 8a and 8b are comprised of a sliding contact type thrust bearings, such as spacer thrust bearings, the thrust bearings 8a and 8b are brought into surface contact with the retainer plates 2. And, thus, when the lubricant supplied from a source through the supply port 6, it is splashed against the thrust bearings 8a and 8b due to centrifugal forces; however, the lubricant thus supplied is blocked by the bearings 8a and 8b since they are in surface contact with the respective retainer plates 2. If the lubricant is not supplied sufficiently to the sliding contacts of the thrust bearings 8a and 8b, heat is produced in the thrust bearings 8a and 8b significantly and they may be damaged or malfunction. In the prior art structure shown in FIG. 9, since the thrust bearings 8a and 8b are in surface contact with the respective retainer plates 2, the lubricant supplied through the supply port 6 is not sufficiently and continuously supplied into the sliding contacts of the thrust bearings 8a and 8b.

SUMMARY OF THE INVENTION

In accordance with the present invention, there is provided a retainer plate for retaining a one-way clutch assembly in position between a pair of associated outer and inner rings between which the one-way clutch assembly is disposed, which retainer plate is generally ring-shaped and having a pair of radially extending opposite surfaces at least one of which is formed with a plurality of radially extending recesses spaced apart from each other angularly. Preferably, the retainer plate is comprised of a metal plate relatively thin in thickness and the ring-shaped retainer plate is stamped to define a plurality of radially extending recesses which extend from the inner edge to the outer edge on opposite sides of thereof. Thus, each of the plurality of recesses defines a passage when the present retainer plate is mounted in position as sandwiched between a one-way clutch assembly and a thrust bearing, thereby allowing a lubricant to be sufficiently supplied to intended locations.

It is therefore a primary object of the present invention to obviate the disadvantages of the prior art as described above and to provide an improved retainer plate for retaining a one-way clutch assembly in position.

Another object of the present invention is to provide an improved retainer plate of a one-way clutch assembly, which allows a lubricant to be supplied to intended locations sufficiently.

A further object of the present invention is to provide an improved retainer plate of a one-way clutch assembly, which allows to maintain a high performance and insure a long life of a one-way clutch assembly.

Other objects, advantages and novel features of the present invention will become apparent from the following detailed description of the invention when considered in conjunction with the accompanying drawings.

BRIEF DESCRIPTION OF THE DRAWINGS

FIG. 3 is a schematic cross-sectional view showing a structure in which a one-way clutch assembly is mounted in position between a pair of outer and inner rings using a pair of retainer plates of the present invention;

FIG. 4 is a schematic cross-sectional view showing on an enlarged scale a part of the structure shown in FIG. 3;

DESCRIPTION OF THE PREFERRED EMBODIMENTS

Figure 1:
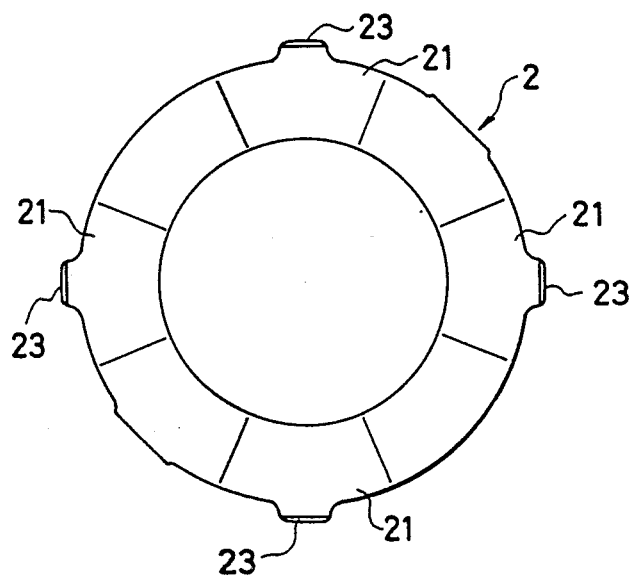
FIG. 1 is a front view showing a retainer plate of a one-way clutch assembly constructed in accordance with one embodiment of the present invention.
Figure 2:
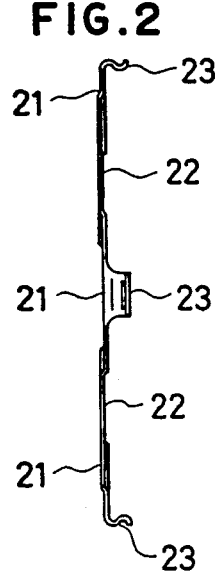
FIG. 2 is a side elevational view showing the retainer plate of FIG. 1.

Referring now to FIG. 1, there is schematically shown a retainer plate 2 of a one-way clutch assembly constructed in accordance with one embodiment of the present invention. FIG. 2 shows in side elevation the retainer plate of the present invention, and FIG. 3 shows a structure in which a one-way clutch assembly is mounted in position using the present retainer plate. As shown in FIG. 1, the retainer plate 2 is generally ring-shaped or annular disc-shaped. The retainer plate 2 has a pair of opposite surfaces extending radially from an inner periphery to an outer periphery. Of importance, the retainer plate 2 is not flat, but it is bent at a plurality of locations in angular direction to thereby define a plurality of recesses on both sides. For example, in the retainer plate 2 shown in FIG. 1, the retainer plate 2 is bent at a predetermined angular interval to define a plurality of left-hand recesses 21 and a plurality of right-hand recesses 22 alternately. That is, the left-hand and right-hand recesses 21 and 22 are formed alternately in an angular direction of the retainer plate 2.

The retainer plate 2 is preferably formed by blanking and stamping a relatively thin metal plate. Thus, if portions of the retainer plate 2 are bent in one direction with respect to a plane defined by the retainer plate 2, there are formed a plurality of left-hand recesses 21 at angular intervals. At the same time, the right-hand recesses 22 are formed each between the two adjacent left-hand recesses 21. Thus, the left-hand recess 21 is a flat area whose surface is shifted in position with respect to the right-hand recess 22, which is also a flat area, in a direction perpendicular to the plane of the retainer plate 2. Described more in detail with respect to FIG. 2, the left-hand recess 21 is defined by a portion of the retainer plate 2 which is shifted to the right with respect to the right-hand recess 22 in a direction perpendicular to the plane defined by the retainer plate 2. And, the left-hand recess extends from the inner periphery of the retainer plate 2 to the outer periphery of the retainer plate 2 continuously. Accordingly, for example, when the left-hand surface of the retainer plate 2 is brought into surface contact with a flat surface, only the right-hand recesses 22 are brought into surface contact with such a flat surface and a gap is defined between such a flat surface and each of the left-hand recesses 21. Such a gap defines a channel or passage through which a lubricant, such as oil, can flow.

The retainer plate 2 is also formed with a plurality of clamp pawls 23 at equal angular intervals. In the illustrated embodiment, each of the clamp pawls 23 is formed in the form of a projection which projects in one direction from the outer periphery of each of the left-hand recesses 21. As will be described in detail later, these clamp pawls 23 are used to have the retainer plate 2 clamped to an outer ring 3. That is, as shown in FIG. 3, after placing a one-way clutch assembly 1 between an outer ring and an inner ring 4, the present retainer plate 2 is clamped to the outer ring 3 using these clamp pawls 23. And, then a pair of thrust bearings 8a and 8b, such as spacer type thrust bearings, may be fitted between the retainer plate 2 and a stationary object. In this manner, the structure shown in FIG. 3 is completed and the one-way clutch assembly 1 is securely maintained in position. In this structure, each of the thrust bearings 8a and 8b is in contact with the present retainer plate 2; however, since the present retainer plate 2 is formed with left-hand recesses 21, only the right-hand recesses 22 are brought into surface contact with the outer ring 3 and a gap or passage is defined between the outer ring 3 and the retainer plate 2 by the left-hand recesses 21. At the same time, only the left-hand recesses 21 are brought into contact with the thrust bearing 8a and the right-hand recesses 22 are not brought into contact with the thrust bearing 8a to thereby define channels or passages between the retainer plate 2 and the thrust bearing 8a. A similar structure is provided at the opposite side of the outer ring 3 where a combination of another retainer plate 2 and the thrust bearing 8b is provided.

As described above, in accordance with the present invention, since the retainer plate 2 is not flat completely, but it is wavy in nature, there is formed a plurality of radially extending passages when it is brought into contact with the outer ring 3 when assembled as shown in FIG. 3. Such a plurality of radially extending passages allow a lubricant supplied from the supply port 6 toward the outer periphery of the outer ring 3 and toward the clutch plate assembly 5 through the through holes 7. At the same time, the lubricant passing through these passages may contribute to lubricate the sliding surfaces of the thrust bearings 8a and 8b at all times.

FIG. 4 shows in detail how a flow passage is defined when the present retainer plate 2 is set in position. The retainer ring 2 is set in position by bringing its clamp pawl 23 in engagement with a circumferential protrusion formed at the outer ring 3. With the retainer plate 2 so clamped, the one-way clutch assembly 1 is maintained in position between the outer and inner rings 3 and 4. However, since only the left-hand recesses 21 are brought into contact with the outer ring 3 and also a side ring of the one-way clutch assembly 1, there are formed a plurality of flow passages between the outer ring 3 and the retainer plate 2 by the right-hand recesses 22. Thus, the lubricant supplied into the one-way clutch assembly 1 through the supply port 6 flows out of the one-way clutch assembly 1 due to centrifugal forces and then the lubricant flows through these passages defined by the right-hand recesses 22 radially outwardly as indicated by the arrows in FIG. 4.

Figure 5:
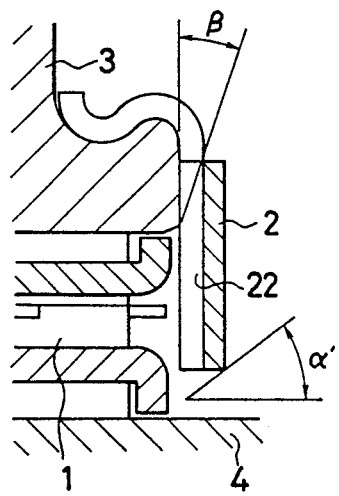
FIG. 5 is a schematic cross-sectional view which is useful for explaining the advantages of the present retainer plate.
Figure 6:
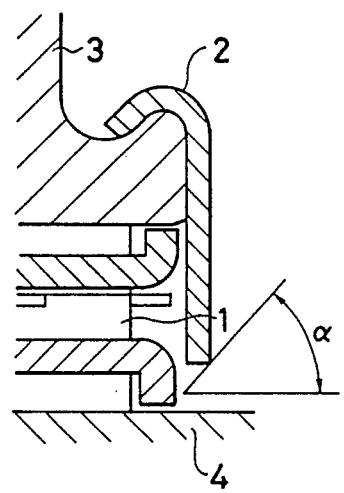
FIG. 6 is schematic cross-sectional view for explaining the lubricant discharging characteristic of the prior art structure.

Now, FIG. 6 illustrates the condition how the lubricant is discharged and sprayed in a typical prior art structure. As described before, in the prior art structure, since no flow passages are provided between the retainer plate and the outer ring 3, the lubricant is allowed to be discharged only through a gap defined between the inner periphery of the prior art retainer plate 2 and the inner ring 4. Thus, the angle of discharge is defined by alpha which is rather limited. On the other hand, in accordance with the present invention, as shown in FIG. 5, since there are provided a plurality of flow passages between the retainer plate 2 of the present invention and the outer ring 3, there is provided an additional flow discharge angle beta in addition to a flow discharge angle alpha'. As a result, in accordance with the present invention, there is provided a net discharge angle which is much larger than that of the prior art. Moreover, since the lubricant may be supplied to clutch plate assembly 5 positively through the flow passages defined by the recesses 22 of the retainer plate 2 due to centrifugal forces, the flow discharge angle alpha' may be set at any desired value. This allows to provide an added flexibility in designing.

Figure 7:
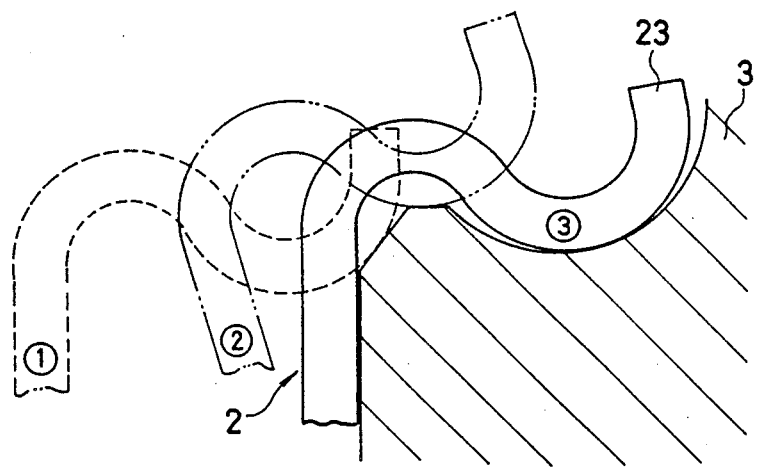
FIG. 7 is a schematic schematic cross-sectional view showing one example of a manner of setting the present retainer plate in position using a snap fit type structure.
Figure 9:
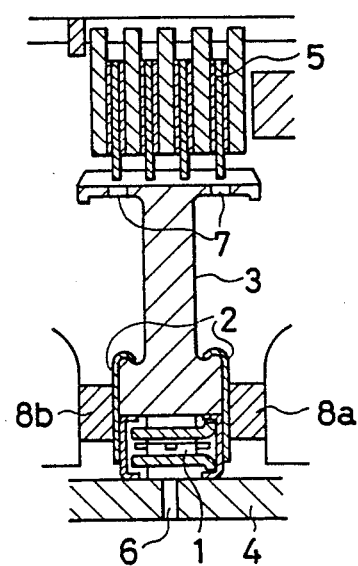
FIG. 9 is a schematic cross-sectional view showing a typical prior art structure for mounting a one-way clutch assembly in position between a pair of outer and inner rings using a pair of prior art retainer plates.

In the preferred embodiment, the retainer plate 2 or at least the clamp pawls 23 are formed to have a springy characteristic. For example, in one embodiment, the retainer plate 2 is made of a resilient metal so that the clamp pawls 23 are formed to be resilient or springy. Such a structure provides an added advantage because the retainer plate 2 may be snap-fitted to the outer ring 3 as shown in FIG. 7, which is easy in manufacture and effective in retaining characteristic. In the prior art structure shown in FIG. 9, the clamp pawls of the retainer plate 2 were clamped to the outer ring 3 by calking. Such a structure was not advantageous because it required skills and experiences, and, moreover, the calked connection provided only a limited service life. In accordance with the preferred embodiment of the present invention, since the clamp pawls 23 are formed to be springy or resilient, the retainer plate 2 may be clamped to the outer ring 3 simply by pushing the retainer plate 2 toward the outer ring 3 until the clamp pawls 23 move over the circumferential ridge defined in the outer ring 3. Such a snap fit arrangement is particularly advantageous because it is easy in process and provides an extended period of service life.

FIG. 7 illustrates a process in which the clamp pawl 23 is brought into a clamping position by pushing the retainer plate 2 against the outer ring 3. As shown, in the first step (circle 1), the clamp pawl 23 is brought into contact with the circumferential ridge of the outer ring 3 and in the second step the retainer plate 2 is further pushed against the outer ring 3 so that the clamp pawl 23 is slightly widened resiliently. And, the clam pawl 23 is finally brought into its clamping position by passing over the circumferential ridge of the outer ring 3 at the third step (circle 3). When the retainer plate 2 is mounted in position in this manner, the retainer plate 2 is tightly and securely attached to the outer ring 3, so that the one-way clutch assembly 1 may be maintained in position securely.

Figure 8A:
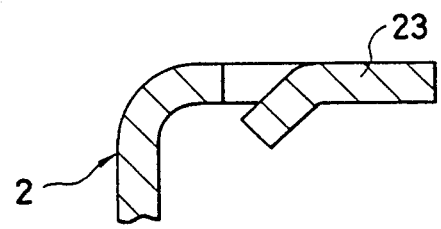
FIGS. 8a and 8b are cross-sectional partial views of other alternatives for forming a snap fit type structure in the present retainer plate.
Figure 8B:
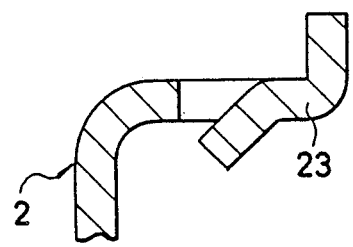

FIGS. 8a and 8b illustrate alternative embodiments of clamp pawls 23 which may be used in the present retainer plate advantageously. In these alternative embodiments, the clamp pawls 23 are formed by cutting portions of the retainer plate and bending them radially inwardly. The retainer plate 2 may be securely attached to the outer ring 3 by bringing the inwardly bent clamp pawls 23 in engagement with the circumferential ridge of the outer ring 3.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

We claim:

1. A retainer plate for retaining a one-way clutch assembly axially in position between a pair of inner and outer rings, and retainer plate being generally ring-shaped and provided with at least one surface extending radially from an inner periphery to an outer periphery, said surface being provided with at least one recessed portion on each side of said plate with respect to a remaining portion of said surface on each of said sides, said recessed portions defining a plurality of flow passages extending radially of said plate, to thereby prevent said recessed portion on one side of said plate from being brought into contact with a contact surface when said remaining portion of said surface on said one side of said plate is brought into contact with said contact surface such that a lubricant can flow through said flow passages.

2. The retainer plate of claim 1, wherein said retainer plate includes a plurality of clamp pawls which may be brought into engagement with an engaging means of said outer ring to have said retainer plate fixedly attached to said outer ring.

3. The retainer plate of claim 2, wherein said clamp pawls are springy and thus brought into engagement with said engaging means of said outer ring in a snap fit fashion.

4. The retainer plate of claim 3, wherein said retainer plate is made of a resilient material.

5. The retainer plate of claim 4, wherein said resilient material is a metal.

6. The retainer plate of claim 1, wherein said recessed portions are provided at angular intervals in the circumferential direction of said retainer plate, whereby each of said recessed portions defines a radially extending flow passage with said contact surface through which a lubricant may pass.

7. The retainer plate of claim 1, wherein said retainer plate is made of a relatively thin metal plate by bending at a plurality of locations in its circumferential direction.

8. The retainer plate of claim 1 wherein one recess portion on one side of said plate is formed in a plane parallel to and spaced from the plane of the remaining portion of said surface.

9. The retainer plate of claim 1 in which a series of said recessed portions extend alternately in an angular direction from the respective sides of said plate.

10. A retainer plate for retaining a one-way clutch assembly axially in position between a pair of inner and outer rings, said retainer plate being generally ring-shaped and provided with at least one surface extending radially from an inner periphery to an outer periphery, said surface being provided with at least one recessed portion with respect to a remaining portion of said surface to thereby prevent said recessed portion from being brought into contact with a contact surface when said remaining portion of said surface is brought into contact with said contact surface; and wherein said recessed portions are provided at angular intervals in the circumferential direction of said retainer plate, whereby each of said recessed portion defines a radially extending flow passage with said contact surface through which a lubricant may pass.

* * * * *

UNITED STATES PATENT AND TRADEMARK OFFICE
CERTIFICATE OF CORRECTION

PATENT NO.    : 4,961,486
DATED         : October 9, 1990
INVENTOR(S)   : Yoshio Kinoshita, Shigeaki Koshino, Yoshiaki Sakai It is certified that error appears in the above-identified patent and that said Letters Patent is hereby corrected as shown below:

```
     On the front page of the patent, under line designator
[22] insert: --[30] Foreign Application Priority Data
        Sept. 22, 1987 [JP]    Japan..........62-144681--.
```

Signed and Sealed this

Twenty-fifth Day of January, 1994

Attest:

BRUCE LEHMAN

Attesting Officer

Commissioner of Patents and Trademarks